COLOR TELEVISION IMAGE REPRODUCTION

Filed Feb. 1, 1952

2 Sheets-Sheet 1

INVENTOR
George C. Sziklai
BY
[signature]
ATTORNEY

Aug. 9, 1955 G. C. SZIKLAI 2,715,153

COLOR TELEVISION IMAGE REPRODUCTION

Filed Feb. 1, 1952 2 Sheets-Sheet 2

Fig. 2.

| PHASE DIFFER-ENCE | ROTATOR 49 | PLANE OF POLAR-IZATION | FILTER 43 | ROTATOR 51 | PLANE OF POLAR-IZATION | ROTATOR 53 | PLANE OF POLAR-IZATION | FILTER 45 | ROTATOR 55 | PLANE OF POLAR-IZATION | ROTATOR 57 | PLANE OF POLAR-IZATION | FILTER 47 | RESULT |
|---|---|---|---|---|---|---|---|---|---|---|---|---|---|---|
| NO SUB-CARRIER | I | V | RGB | I | V | I | V | RGB | I | V | I | V | RGB | WHITE |
| 0° | A | H | GB | A | V | I | V | GB | I | V | I | V | GB | CYAN |
| 60° | A | H | GB | A | V | A | H | G | A | V | I | V | G | GREEN |
| 120° | I | V | RGB | I | V | A | H | RG | A | V | I | V | RG | YELLOW |
| 180° | I | V | RGB | I | V | A | H | RG | A | V | A | H | R | RED |
| 240° | I | V | RGB | I | V | I | V | RGB | I | V | A | H | RB | MAGENTA |
| 300° | A | H | GB | A | V | I | V | GB | I | V | A | H | B | BLUE |

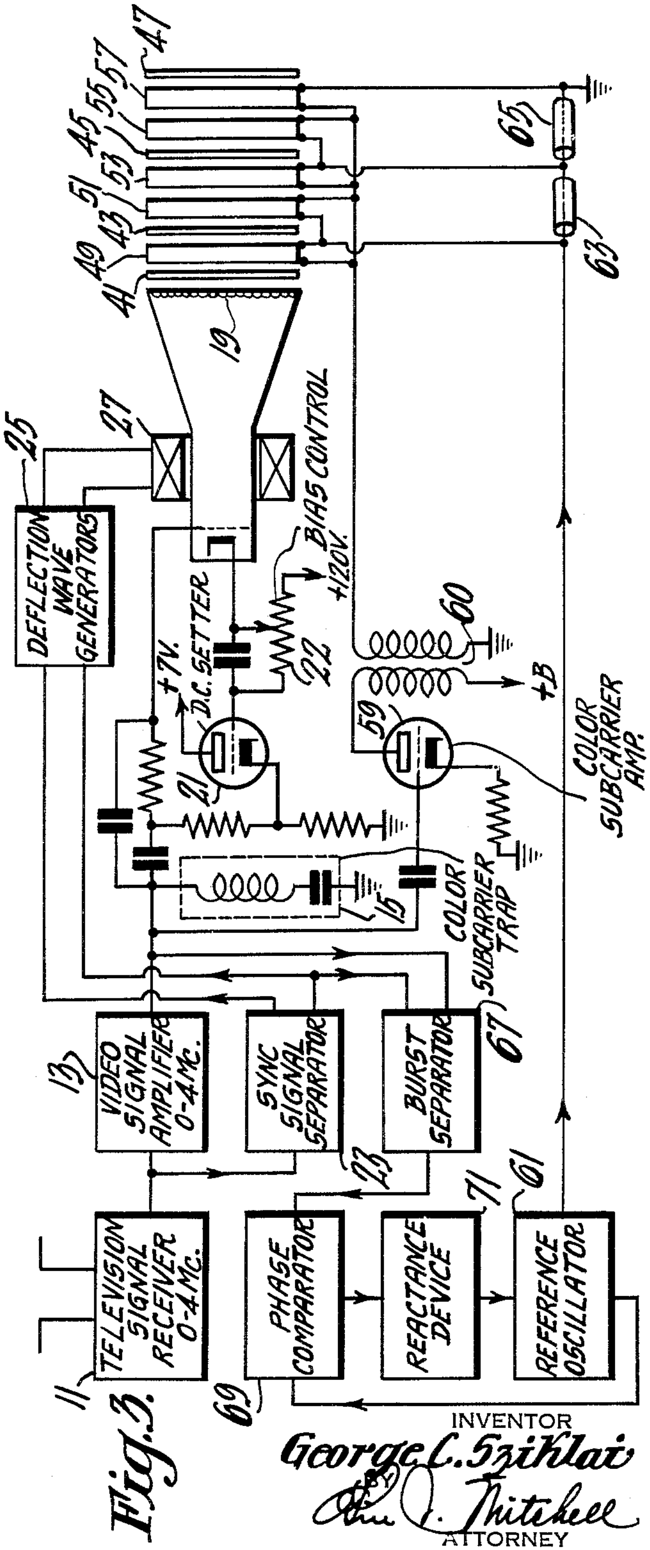

Fig. 3.

INVENTOR
George C. Sziklai
BY
[signature] Mitchell
ATTORNEY

United States Patent Office 2,715,153

Patented Aug. 9, 1955

2,715,153

COLOR TELEVISION IMAGE REPRODUCTION

George Clifford Sziklai, Princeton, N. J., assignor to Radio Corporation of America, a corporation of Delaware Application February 1, 1952, Serial No. 269,551

9 Claims. (Cl. 178—5.4)

This invention relates to color television and particularly to color light valves and circuitry associated therewith.

It is known in the optical art that any color may be produced by adding or combining proper amounts of several selected component colors, such as, for example, red, blue and green, or by subtracting proper complementary colors from white light.

If white light is passed successively through two or more filters which have color absorbing characteristics the light after passage through the final filter retains that portion of the spectral band required to give a desired color. The transmitted colors of the respective filters may be for example, cyan, magenta, or yellow. The cyan is substantially the white light minus red, yellow is substantially white light minus blue and magenta is substantially white light minus green. Each different color filter transmits so much of its respective color as is needed to form the correct resultant color. This principle has been successfully employed in the reproduction of color television images by developing a black and white image and employing subtractive filters. During the scanning process each filter subtracts from white light so much of its particular color as must be excluded from the final image to give a true color image, and all the elements collectively thus reproduce the original image colors.

In recent years, much experimental work has been done in color reproduction systems. An article in RCA Review, December 1949, pages 504–524, entitled "A Six Megacycle Compatible High-Definition Color Television System," describes a subcarrier multiplex system which is suitable for a total channel assignment of six megacycles, the band width allowed in present day black and white transmission, and is completely compatible with the current black and white television system.

This invention relates to a color television system operating in accordance with the well-known subcarrier multiplex principle. In such a system video signals representing the brightness of an object are transmitted substantially in the manner usually employed for the transmission of black and white video signals. The video signals representing the color hue and color saturation of the different elemental areas of the object are transmitted on a subcarrier in such a manner that both the brightness and the color signal components are transmitted substantially simultaneously in the same channel for a fixed frequency band. This transmission is effected by the subcarrier multiplex process and the mixed-highs principle which are explained in the above mentioned article in RCA Review.

In one way of carrying out such a transmission, there is produced a phase- and amplitude-modulated color carrier wave or color detail signals having a nominal frequency within the frequency pass band of the channel which is usually approximately 4 mc. higher than the main carrier and it is an odd multiple of the half line frequency to provide horizontal interlacing. This color carrier wave is modulated both in phase and in amplitude to represent the color of the subject. The basic modulation of the main carrier represents the brightness in the television signal, while the subcarrier is modulated in amplitude by the saturation and in phase by the hue of the color of the scanned area.

According to this invention there is provided a color receiver which utilizes a picture reproducer of the single-tube type having a single electron gun. In this simplified color receiver for the subcarrier color system, only the brightness signal, or black and white image, is reproduced by the main carrier on the screen of the kinescope. The colors are reproduced by a light valve controlled by the color subcarrier. The color light valve subtracts the proper complementary colors from the black and white image to produce the desired color image. This method of reproduction permits the full utilization of the mixed-highs principle since either channel may be reproduced with any desired detail independently. A conventional black and white television receiver can be converted into a color television receiver very easily by adding to it this color light valve and the associated circuitry necessary for proper operation.

The light valve consists of an arrangement of polarizing plates or selective polarized color filter elements and polarization rotators, such as Kerr cells, electro-optical crystals, etc.

The polarizing plates are used to select only one plane of ordinary light. Ordinary, or natural, light can be regarded as a wave motion in which the direction of vibration suffers changes in orientation too rapid to be detected by any means at our disposal. It is possible, however, to obtain from natural light a radiation having vibrations of fixed type and orientation, and the behavior of such light when it encounters matter depends upon this orientation. For example, it is possible to obtain light which a glass or water surface refuses to reflect at a certain angle of incidence. Such light is said to be polarized and the polarization may be one of three types, plane, elliptical, or circular, according to the type of vibration. In this invention the light from the black and white image is plane polarized by the polarizing plates. These plates may be made by embedding minute dichroic crystals such as herapathite, in a cellulose acetate film, aligning them by a stretching process and mounting between glass plates, or it may consist of a pane compounded of a sheet of plastic holding orientated iodo-quinine crystals between two panes of protecting glass.

The subject of polarizing plates and of the polarization of light in general is treated extensively by Robert W. Wood in his book entitled Physical Optics, pages 329–364. Of interest is a chapter on "Polarization" in the book Optics, pages 319–343, written by Fincham.

The plane of polarization of transmitted polarized light may be rotated by using polarization rotators such as Kerr cells. The method of rotation is fundamentally known as the Kerr effect, and the particular plates may conveniently be called "Kerr cells." Such Kerr cells or polarization rotators are crystals which have the property of functioning as biaxial crystals, whenever a potential is applied to two opposite faces, for a beam of light passing in the direction of the applied electric field, the latter being parallel to the optic axis. In general, the amount of rotation effected is a linear function of the impressed voltage. Additional information on the subject of Kerr cells may be obtained by referring to a book entitled Television by Zworykin and Morton, pages 245–251.

In accordance with this invention, a color image of an object may be reproduced from the black and white image of that object by applying the proper color detail signals to polarization rotators which are interpositioned between a plurality of selective polarized color filters or plates.

A primary object of this invention is to provide an improved color television receiver.

Another object of this invention is to provide an improved color reproducing system.

Still another object of this invention is to provide for color reproduction by all electronic devices.

A further purpose of this invention is to provide a simplified color receiver using a single kinescope and a single electron gun.

Another purpose of this invention is to provide a color receiver wherein color images may be simply reproduced by subcarrier controlled light valves.

An additional object of this invention is to provide a simple color converter for black and white television receivers.

Other and incidental objects of this invention will be apparent to those skilled in the art from a reading of the following specification and an inspection of the accompanying drawings in which:

Fig. 2 is a table showing the results obtainable upon energizing various combinations of polarization rotators.

Fig. 3 illustrates a simplified arrangement of the invention shown in Fig. 1, and, Fig. 4 shows graphically the subcarrier signal with respect to the reference potential as they are applied to the polarization rotators of Fig. 3 at various intervals.

Figures 1, 4:
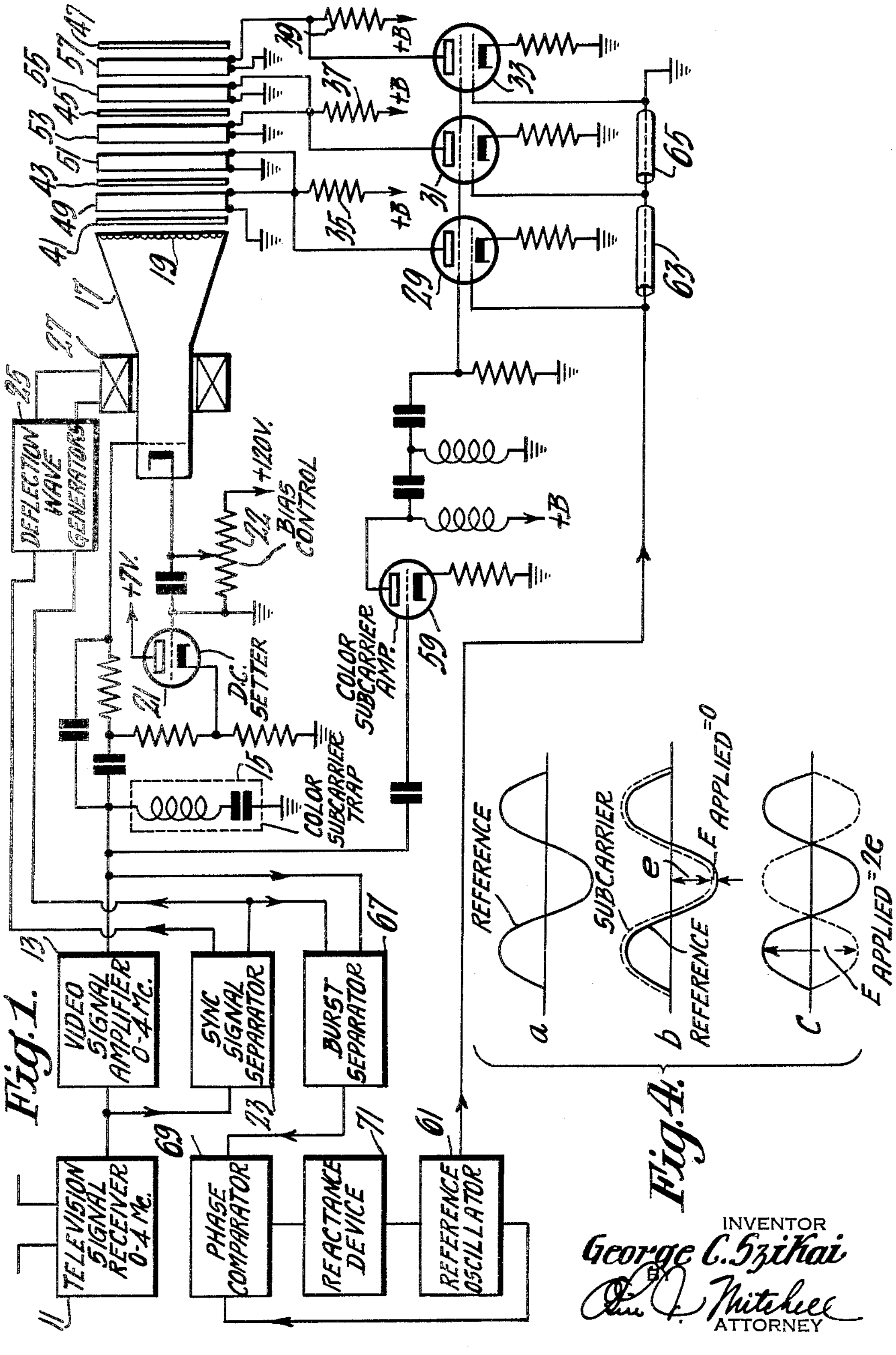
Fig. 1 shows schematically one form of this invention illustrating one combination of polarization rotators and selective polarized color filters properly positioned in the circuit diagram of a subcarrier multiplex television receiver.

In order to more fully appreciate the present invention, a general description of a color television system embodying the invention will first be given. It will be assumed that the invention is embodied in a television system operating in accordance with the multiplex principle as disclosed in the above-mentioned article in RCA Review. In such a system, signals are generated, transmitted and received representing each of the three component colors of a multiplicity of successive elemental areas of a subject. The rate at which the video signal representing each of the different colors are repeated is called the color sampling frequency. In view of the character of the multiplex system, it is seen that the color sampling frequency is relatively high, and in general is of the order of from approximately 3.6 to approximately 4 mc. and is an odd multiple of the half line frequency to provide horizontal interlacing.

Turning now in more detail to Fig. 1 of the drawings, the signal-modulated carrier wave radiated by the transmitter is received by a television signal receiver 11 of a type which may be employed for demodulating and suitably amplifying a composite black and white television signal.

The demodulated video signals, including the brightness component and the individual color components, is impressed upon the video signal amplifier 13 which has a pass band for all frequencies up to approximately 4 mc. After the subcarrier frequency is attenuated by the trap 15 the composite video signal is fed in the conventional manner to the grid of the kinescope 17 which reproduces the black and white image on a short persistence phosphor 19.

The average background illumination of the image is a function of the D. C. component of the transmitted signal. Due to the use of coupling capacitors in the receiver circuit, the D. C. component is not passed, and the resultant video signal is the A. C. signal of the impressed information. The direct current component of the composite video signal is restored by the D. C. setter 21. The proper D. C. reference level for the video signal may be fixed by using the D. C. setter 21 as shown in Fig. 1, or any conventional diode D. C. restorer may be used. To effect brightness control, any conventional biasing means, such as the bias control 22 shown in the drawings, may be used to bias the electron gun of the kinescope.

The synchronizing signal channel includes a sync signal separator 23 connected to the output circuit of the receiver 11 in the usual manner. The sync signal separator separates the synchronizing pulses from the video signal component and also separates the horizontal and vertical synchronizing pulses from one another. The sync signal separator 23 is coupled to a deflection wave generator 25 which functions in response to the horizontal and vertical synchronizing pulses to produce substantially saw tooth wave energy at both the horizontal and vertical deflection frequencies of 15,750 cycles and 60 cycles, respectively. The output of the deflection wave generator 25 is coupled to the deflection yoke 27 in the usual manner so as to energize it at both the horizontal and deflection frequencies.

The recovery of the relatively low frequency color video signals from the composite video signal is effected by means of a demodulator operating at the color sampling frequency used at the transmitter. This apparatus includes demodulator tubes 29, 31, and 33 which detect the phase and amplitude of the color video signals. The demodulator apparatus shown in the drawings is merely symbolic and, therefore, it should not be limited to the type illustrated and described. The anode voltage for the tubes 29, 31, and 33 is supplied from a source indicated at +B through the output load resistors, 35, 37, and 39 respectively. These anodes are connected to the polarization rotators 49, 51, 53, 55, and 57 of the color light valve. The detailed operation of the color light valve will be explained hereinafter.

The composite video signal derived from video signal amplifier 13 is also applied to the high pass amplifier 59 which amplifies the subcarrier signal. This subcarrier signal is then impressed upon one of the grids of each of the three demodulator tubes 29, 31, and 33, A second grid of each of these tubes is energized by different phases of reference frequency wave generated by the receiver reference oscillator 61.

The receiver reference oscillator 61 is essentially the equivalent of the corresponding oscillator at the transmitter and has the same frequency output. The receiver reference oscillator 61 is coupled to one grid of each of the demodulator tubes 29, 31, and 33 either directly or through one or more delay lines 63, 65. The phase relationship between the waves impressed upon the demodulator tubes 29, 31, and 33 is determined by the character of the delay lines 63 and 65. If it be assumed, for illustrative purposes, that the video signal sampling is effected in a symmetrical manner, that is, the three carrier wave phases representing different colors are displaced 120° relative to each other, each delay line must be made to effect a 120° phase delay. In this manner, the waves impressed upon the demodulator tubes 29, 31, and 33 are out of phase with respect to the reference frequency wave at reference oscillator 61 by 0, 120, and 240 degrees, respectively.

In order to maintain synchronized operation between the receiver reference oscillator and the transmitter oscillator, it is necessary to recover from the received television signal the burst of energy at the reference frequency appearing on the back porch of the horizontal blanking pedestals. The details of apparatus which may be used in practicing this feature of the system forms the subject material of a co-pending application of Alda V. Bedford, Serial No. 143,800, filed February 11, 1950, and entitled "Synchronizing Apparatus." Essentially, there is provided a burst separator 67 having an input circuit coupled to the output circuit of the video signal amplifier 13. The burst separator 67 is essentially a gating device which is rendered operative only during the back porch intervals of the composite television signal under the control of horizontal synchronizing pulses from the sync signal separator 23.

As a result of the operation of the burst separator 67, there is produced in its output circuit a short burst of energy having the frequency of the transmitter reference oscillator. The output of the burst separator 67 and the output of the receiver reference oscillator 61 are impressed upon a phase comparator 69. Any phase difference between the two waves is effective to operate a reactance device 71 which is coupled to the oscillator 61 in the usual manner for controlling its frequency.

The light valve which is placed on an optical axis with the face of kinescope 17 has no mechanically moving parts. The light valve consists of a light polarizer 41, a plurality of selective polarized color filters 43, 45, and 47 and a plurality of polarization rotating electro-optical devices 49, 51, 53, and 55 and 57. For the purpose of illustration only, we can assume that the light polarizer 41 transmits only white light with vertical polarization, that the selective polarized color filters 43, 45, and 47 transmit all vertically polarized light but that each filter subtracts one primary color and transmits the other two primary colors of horizontally polarized light, and that the polarization rotators 49, 51, 53, 55, and 57 are any electro-optical devices which can rotate the plane of polarization of light from 0° to 90°. The selective polarized color filters 43, 45, and 47 subtract from the black and white image which is produced on the face of the kinescope 17 so much of the particular color as must be excluded from the final image to give the true color image. The amount of exclusion of a particular color is dependent upon the position of the plane of polarization at a particular filter, and the position is dependent upon the output of the modulator tube which activates one or more polarization rotators associated with that particular filter.

The subcarrier or color detail signal is impressed upon one of the grids of each modulator tube 29, 31, 33 and the sampling frequency from the reference oscillator 61 is impressed upon a second grid of each modulator tube 29, 31, 33 either directly or through one or more delay lines 63, 65. When the algebraic sum of these two voltages at any instant at a particular tube becomes equal to a certain value that tube will operate and the polarization rotating electro-optical devices which are connected to that particular tube will rotate the plane of the polarized light. Other forms of phase detection that may activate the electro-optical devices according to the phase and amplitude of the subcarrier have been shown in my copending application, Serial No. 169,594, filed June 22, 1950, entitled "Multiplex Systems."

In order to obtain a better understanding of the operation of the color light valve, assume, for the purpose of illustration, that polarizer 41 transmits white light with vertical polarization only, and the color polarizers 43, 45, and 47 are all transparent for vertically polarized light. A black and white picture will be transmitted when the subcarrier amplitude is zero since at zero subcarrier amplitude all the electro-optical rotators will then be inactive. Thus, the vertically polarized component of the image will go straight through the light valve arrangement 41 through 47. When the subcarrier amplitude is not zero, the electro-optical rotators 49, 51, 53, 55 and 57 will rotate the plane of polarization an amount depending on the phase and amplitde of the subcarrier waves with respect to the reference oscillator wave at each of the modulators 29, 31, and 33.

When the plane of polarization is horizontal, polarizer 43 transmits only the cyan (minus red) components of a horizontally polarized light while polarizer 45 transmits only the yellow (minus blue) components and polarizer 47 transmits only the magenta (minus green) components. Thus, depending on the output of modulator tubes 29, 31, and 33, the electro-optical cells 49, 51, 53, 55, and 57 rotate the polarization and cause the transmitted light to appear in color.

Fig. 2 in the drawings is a table showing the results obtainable upon effecting various combinations of electric fields by energizing the respective and corresponding electro-optical devices. In the table the term "phase difference" relates to the subcarrier wave with respect to the reference oscillator wave at modulator 29; the letter "I" indicates an inactive rotator field and "A" indicates the establishment of an active field and hence rotation effects through a 90° angle by the particular rotator energized; "V" and "H" indicate the vertical and horizontal position, respectively, of the plane of polarization after passing through each particular rotator; "R," "G" and "B" indicate the primary colors, red, green, and blue, respectively, which are transmitted through each particular filter when the "phase difference" is as indicated in the first column.

The derivation of the results obtained in the final column of Fig. 2 can be best explained by taking a typical example of the operation of the light valve. Thus, when the phase difference is 0°, a final color of cyan is obtained as follows: light polarizer 41 absorbs horizontal vibration of unpolarized white light entirely, transmitting the plane polarized vertical vibration; with rotator 49 energized the plane of rotation is rotated 90°, converting the vertically polarized white light to horizontally polarized white light and hence the minus red filter 43 subtracts the red component while transmitting the green and the blue components of the horizontally polarized white light. This leaves the green and blue components free to continue through rotator 51; however, plate 51 is also energized and, therefore, the plane of polarization is once again rotated 90°, placing the plane of polarization once again in a vertical position; since plates 53, 55, and 57 are not energized, the blue-green vertical light will pass through the remaining elements in the light valve with little if any selective absorption and the resulting color is cyan.

It is to be understood that this invention is not to be limited to the arrangement of elements illustrated. Various other arrangements, or units different from those illustrated and described, may be used which are within the scope of this invention. For example, the selective polarized color filter and its associated polarization rotating electro-optical devices may be combined into one unit. Furthermore, current sensitive color filters of the type described in my co-pending application U. S. Serial No. 46945, filed August 31, 1948, now Patent No. 2,632,045 granted March 17, 1953 and entitled "Improvement in Electro Chemical Color Filters," may also be used advantageously in the light valve arrangement.

A simplified arrangement of my invention is shown in Fig. 3. In this case, the electro-optical rotators, cells, or crystals 49, 51, 53, 55, and 57, themselves act as phase and amplitude demodulators. The multiplex signal is applied to the video amplifier 13 and then to the subcarrier amplifier 59 as in Fig. 1. The brightness signal is applied in the usual manner to the grid of kinescope 17 and the black and white picture appears on its short persistence phosphor 19. From the subcarrier amplifier 59 the signal is transferred by a band-pass transformer 60 to one of the electrodes of each of the rotators 49, 51, 53, 55, and 57. The other terminals of the rotators 49, 51, 53, 55, and 57 are connected either directly or through one or more delay lines 63, 65 in the proper phase relation to the reference oscillator 61 which is generating a frequency equal to the subcarrier frequency. When no signal from band-pass transformer 60 is present, the reference oscillator wave alone rotates the polarization in polarization rotator 49 by 45°. Therefore, filter 43 should be turned 45° with respect to the transparent plane of filter 41 to transmit all the polarized white light. Polarization rotator 51 under this condition rotates the polarization by another 45° and polarization rotator 53 also rotates the polarization by another 45°, thus filter 45 should be turned 135°. Similarly, filter 47 should be turned 225° for the same reason. When the filters are so positioned a black and white picture will be transmitted when no signal is received from band-pass transformer 60.

When the incoming signal from band-pass transformer 60 and the reference voltage from reference oscillator 61 are in phase and of equal amplitudes at one of the rotators, the voltage developed across the terminals of this rotator will be zero and the cell becomes inactive. When the incoming signal and the reference are 180° out of phase at a particular rotator, the maximum voltage will appear across that rotator with a frequency of the subcarrier. Fig. 4A shows the reference potential alone, Fig. 4B shows the reference potential and the subcarrier signal in phase at one of the polarization rotators, or Kerr cells, shown in Fig. 3 and Fig. 4C shows the two signals out of phase.

Having thus described my invention, what I claim and desire to secure by Letters Patent is:

1. Apparatus for reproducing color images from brightness detail signals and color detail signals comprising, means responsive to said brightness detail signals for developing a black and white image, a plurality of polarizing plates, a plurality of polarization rotating electro-optical devices, said plates and said devices positioned along an optical axis of said black and white image, and means responsive to said color detail signals to energize said polarization rotating electro-optical devices in a manner to vary the polarization rotation of said black and white image in correspondence with color changes in successive elemental areas of said image.

2. Apparatus for reproducing color images from brightness detail signals and color detail signals comprising, means responsive to said brightness detail signals for developing a black and white image, a plurality of polarizing plates, a plurality of polarization rotating electro-optical devices interpositioned between some of said polarizing plates, said plates and said devices positioned along an optical axis of said black and white image, and means responsive to said color detail signals to energize said polarization rotating electro-optical devices to vary the polarization rotation of said black and white image in correspondence with color changes in successive elemental areas of said image.

3. Apparatus for reproducing color images from brightness information and color information comprising, means responsive to said brightness information for developing a black and white image, a plurality of polarizing plates, a plurality of polarization rotating electro-optical devices interpositioned between said polarizing plates, said plates and said devices being positioned along an optical axis of said black and white image, means for activating said electro-optical devices, said activating means including amplifiers and means for controlling the gain of each of said amplifiers in accordance with said color information whereby to vary the polarization rotation of said black and white image in correspondence with color changes in successive elemental areas of said image.

4. A color television receiver comprising, means for receiving a composite video signal including a brightness signal component and a color signal component, means responsive to said brightness signal component for developing a black and white image, a plurality of polarizing plates, a plurality of polarization rotating electro-optical devices interpositioned between some of said polarizing plates, said plates and said devices being positioned along an optical axis of said black and white image developing means, and means responsive to said color signal component for controlling the operation of said electro-optical devices in a manner to vary the polarization rotation of said black and white image in correspondence with color changes in successive elemental areas of said image.

5. A color television receiver comprising, means for receiving a composite video signal including a brightness signal component and a color signal component, means responsive to said brightness signal component for developing a black and white image, means for extracting said color signal component from said composite video signal, an arrangement of polarizing plates and polarization rotating electro-optical devices positioned adjacent to said black and white image developing means, and means responsive to said extracted color signal component for effecting the operation of said polarization rotating electro-optical devices in a manner to vary the polarization rotation of said black and white image in correspondence with color changes in successive elemental areas of said image.

6. A color image reproducing system comprising, a black and white image reproducer, a plurality of polarized color filter elements, a plurality of polarization rotating electro-optical devices interpositioned between some of said filter elements, said filter elements and said devices being positioned along an optical axis of said black and white image reproducer, means for receiving a signal representative of a plurality of colors of said color image, and means for connecting said signal receiving means to said electro-optical devices in a manner to vary the polarization rotation of said black and white image in correspondence with color changes in successive elemental areas of said image.

7. In a color image reproducing ssytem, in combination, a cathode ray tube for forming black and white images, a color light valve consisting of a plurality of selective polarized color filter elements and a plurality of polarization rotating electro-optical devices, said filter elements and said rotating devices being positioned along an optical axis of said cathode ray tube, means for obtaining a color detail signal representative of said color image, and means for applying said color signal to said rotating devices in a manner to vary the polarization rotation of said black and white image in correspondence with color changes in successive elemental areas of said image.

8. Apparatus for reproducing color images from brightness detail signals and color detail signals comprising, means responsive to said brightness detail signals for developing a black and white image, a plurality of current sensitive color filters, said current sensitive color filters being positioned along an optical axis of said black and white image developing means, and means for applying said color detail signals to said current sensitive color filters in a manner to vary the polarization rotation of said black and white image in correspondence with color changes in successive elemental areas of said image.

9. A converter to convert a black and white television receiver having an optical axis to a color image reproducer upon the application of a color detail signal comprising, a light valve consisting of a plurality of polarized color filter elements and a plurality of polarization rotating electro-optical devices interpositioned between some of said filter elements, said filter elements and said devices being positioned along said optical axis, and means for applying said color detail signal to said rotating devices in a manner to vary the polarization rotation of said black and white image in correspondence with color changes in successive elemental areas of said image.

References Cited in the file of this patent

UNITED STATES PATENTS

| | | |
|---|---|---|
| 2,493,200 | Land | Jan. 3, 1950 |
| 2,586,635 | Fernsler | Feb. 19, 1952 |
| 2,591,701 | Jaffe | Apr. 8, 1952 |